United States Patent [19]

Vanlautem et al.

[11] 4,182,806

[45] Jan. 8, 1980

[54] PROCESS FOR THE MANUFACTURE OF SALTS OF POLY-ALPHA-HYDROXYACRYLIC ACIDS

[75] Inventors: Nöel Vanlautem, Wavre; Julien Mulders, Dworp, both of Belgium

[73] Assignee: Solvay & Cie., Brussels, Belgium

[21] Appl. No.: 897,647

[22] Filed: Apr. 18, 1978

[30] Foreign Application Priority Data

Apr. 25, 1977 [LU] Luxembourg .............................. 77195

[51] Int. Cl.$^2$ .............................. C08F 8/06; C08F 8/44
[52] U.S. Cl. .................................... 525/369; 525/387; 525/388; 562/590; 562/591
[58] Field of Search ................... 526/47.9, 57; 562/282

[56] References Cited

U.S. PATENT DOCUMENTS

| | | | |
|---|---|---|---|
| 3,637,609 | 1/1972 | Blumbergs et al. | 526/15 |
| 3,994,969 | 11/1976 | Vanlautem et al. | 562/582 |

*Primary Examiner*—William F. Hamrock
*Attorney, Agent, or Firm*—Spencer & Kaye

[57] ABSTRACT

Process for the manufacture of a salt of a poly-alpha-hydroxyacrylic acid, which salt contains monomeric units of the formula:

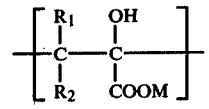

in which $R_1$ and $R_2$ independently represent hydrogen or an alkyl group containing from 1 to 3 carbon atoms, and in which M represents the cationic radical resulting from the dissociation of a base, by reacting, with the base, in the presence of water, a solid polylactone derived from the corresponding poly-alpha-hydroxyacrylic acid, in which process the reaction is carried out in a liquid medium containing water and a diluent, the diluent being one which does not dissolve the polylactone and the salt produced and being present in an amount such that the polylactone and salt produced do not dissolve in the medium. In the process, an oxidizing agent is added to the liquid medium.

4 Claims, No Drawings

PROCESS FOR THE MANUFACTURE OF SALTS OF POLY-ALPHA-HYDROXYACRYLIC ACIDS

BACKGROUND OF THE INVENTION

In the U.S. Pat. No. 3,994,969, there is disclosed a process for the manufacture of salts of poly-alpha-hydroxyacrylic acids which contain monomeric units of the formula:

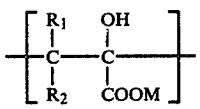

in which $R_1$ and $R_2$ independently represent hydrogen or an alkyl group containing from 1 to 3 carbon atoms, and in which M represents the cationic radical resulting from the dissociation of a base, by reacting, with the corresponding base, in the presence of water, the solid polylactone derived from the corresponding poly-alpha-hydroxyacrylic acid in which process the reaction is carried out in a liquid medium containing a diluent, so that the polylactone and the salt produced do not dissolve in the medium.

However, it is difficult, in accordance with the process of U.S. Pat. No. 3,994,969, to obtain products having an optimum whiteness, which can be used directly as active adjuvants in detergent compositions, for example, in washing powders, or as sequestering agents.

In the manufacture of salts of non-hydroxylic carboxylic acid polymers of reduced molecular weight, it is known to neutralize the corresponding polycarboxylic acid which already has a low molecular weight. See U.S. Pat. No. 3,637,609 which concerns the fabrication of sodium polymaleate by neutralization of polymaleic acid. This process does not generally make it possible to obtain perfectly white products without a subsequent bleaching operation. Thus, in U.S. Pat. No. 3,637,609, the sodium polymaleate salt obtained by the neutralization is in the form of finely divided pale yellow particles which are then bleached with a bleaching agent such as hydrogen peroxide, peracetic acid, sodium hypochlorite, perbenzoic acid or ozone.

SUMMARY OF THE PRESENT INVENTION

It has now been found, in accordance with the present invention, that it is possible to obtain salts of poly-alpha-hydroxyacrylic acids having a whiteness which is identical to, and even greater than, that of the starting solid polylactones.

The present invention provides a process for the manufacture of salts of poly-alpha-hydroxyacrylic acids, which salts contain monomeric units of the formula:

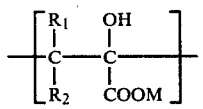

I.

in which $R_1$ and $R_2$ independently represent hydrogen or an alkyl group containing from 1 to 3 carbon atoms, and in which M represents a cationic radical resulting from the dissociation of a base, by reacting, with the base, in the presence of water, a solid polylactone derived from the corresponding poly-alpha-hydroxyacrylic acid, in which process the reaction is carried out in a liquid medium containing water and a diluent, the diluent being one which does not dissolve the polylactone and the salt produced and being present in an amount such that the polylactone and salt produced do not dissolve in the medium, comprising: adding an oxidizing agent to the liquid medium.

It is to be understood that both the foregoing general description and the following detailed description are examplary, but are not restrictive of the invention.

DETAILED DESCRIPTION OF THE INVENTION

The process of the present invention is performed according to the general technique set forth in the above-mentioned U.S. Pat. No. 3,994,969, which is hereby incorporated by reference, with the modification that an oxidizing agent is introduced into the liquid medium.

The oxidizing agent can be introduced into the liquid reaction medium at any time during the neutralization. However, it is preferably introduced into the reaction medium before the neutralizing base.

The oxidizing agents used are chosen from among conventional oxidizing agents. They generally comprise agents which easily liberate oxygen in atomic form. A single oxidizing agent or a mixture of oxidizing agents can be used. The oxidizing agents which are generally used are hydrogen hypochlorite or sodium hypochlorite and hydrogen peroxide. The preferred oxidizing agent is hydrogen peroxide.

The process according to the present invention makes it possible to obtain much whiter products than those obtained in accordance with the process described in the above-mentioned U.S. Pat. No. 3,994,969. In addition, the operating conditions can be adapted, if desired, in order to manufacture a perfectly white polymer which simultaneously has a reduced molecular weight relative to the product which would have been obtained, according to U.S. Pat. No. 3,994,969, starting from the same polylactone. This molecular weight decreases as the amount of oxidizing agent employed increases. It is thus possible, starting from the same polylactone, to obtain polymers of very variable molecular weights, depending on the amount of oxidizing agent employed. The ratio of the molecular weight of the polymer which would be obtained without the addition of oxidizing agent to the molecular weight obtained with the addition of oxidizing agent is generally between 1 and 50. Ratios of between 1.2 and 10 are easily obtained. The molecular weights obtained are very variable, but they are frequently between 500 and 200,000, and generally between 2,000 and 100,000.

The amount of oxidizing agent employed is therefore very variable, depending on whether it is desired to obtain solely a bleaching effect or simultaneously a greater or lesser reduction in the molecular weight relative to that which would have been obtained in accordance with the process described in U.S. Pat. No. 3,994,969, starting from the same polylactone. In addition, the optimum amounts of oxidizing agent to be employed, in order to obtain one or other of these effects, depend on the temperature at which the reaction is carried out. If it is desired to obtain solely a bleaching effect without a substantial reduction in the molecular weight, concentrations of oxidizing agent of between 0.01 and 15 mol%, relative to the hydroxyacrylic units of the desired polymer, and preferably concentrations of between 0.1 and 10 mol%, are used, generally for temperatures of about 15 to 70° C. At the highest temperatures, that is to say at temperatures greater than 70° C., and more particularly at temperatures of between 70 and 150° C., these concentrations are lower and are between 0.01 and 10 mol%, and preferably between 0.1 and 5 mol%.

If it is desired to simultaneously obtain a bleaching effect and a large reduction in the molecular weight, larger amounts of oxidizing agent are employed which vary depending on the desired degree of polymerization and are generally between 2 and 30%, and preferably between 5 and 20%, by weight, relative to the liquid medium while employing the oxidizing agent in amounts, relative to the hydroxyacrylic units in the medium, which are greater than 10 mol%, and preferably greater that 15 mol%. Furthermore, the concentration of oxidizing agent used can be judiciously chosen so that the oxidizing agent has disappeared at the end of the operation.

The duration of the treatment is chosen in particular, according to the exact nature of the starting polylactone, and more particularly its average molecular weight, and according to the operating temperature, the average molecular weight of the salt of poly-alpha-hydroxyacrylic acid which it is desired to obtain, and the required concentration of oxidizing agent. The bleaching treatment generally takes between 30 seconds and 30 minutes, and preferably between 1 minute and 20 minutes. If a substantial reduction in the molecular weight is envisaged at the same time, treatments taking up to 20 hours, and preferably treatments taking between 30 minutes and 10 hours, can be envisaged.

The salt of poly-alpha-hydroxyacrylic acid obtained according to the present invention, which is bleached and optionally of reduced molecular weight, can be used as it is or can be subjected to subsequent treatments such as granulation treatments.

The process according to the present invention can be carried out in any installation, such as a reactor or an autoclave, which makes it possible to carry out the operations described above.

The process can be carried out continuously or discontinuously.

The present improvement makes it possible to obtain white salts of solid poly-alpha-hydroxyacrylic acids. In addition, it makes it possible to obtain polymers of reduced molecular weight, if desired, without loss of product by oxidation or by uncontrolled decomposition, starting from the corresponding polylactone which is also solid. By means of the process of the present invention, it becomes possible, for the class of polymers in question, to obtain a whole range of products having a satisfactory whiteness and various molecular weights, by only carrying out a single polymerization. In addition, the process of the present invention exhibits the advantage of being carried out directly on the liquid medium from the manufacture of the solid polylactone, before neutralization and without intermediate or subsequent separations being necessary.

The polymers obtained according to the present invention can be used for various applications, and especially as active adjuvants in detergent compositions, for example, in washing powders, and as agents for dispersing organic and inorganic molecules.

The process of the present invention can be applied particularly well to the manufacture of salts of homopolymeric poly-alpha-hydroxyacrylic acids. The process of the present invention, however, can also be used for the preparation of salts of copolymers of alpha-hydroxyacrylic acids with other monomers of the vinyl type which are substituted by one or more groups selected from the group consisting of hydroxyl and carboxyl groups.

Monomeric units of the vinyl type of the formula

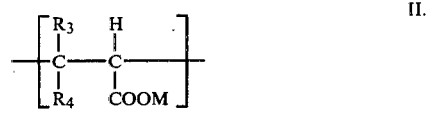

II.

wherein $R_3$ and $R_4$ independently represent a hydrogen atom or an alkyl containing 1–3 carbon atoms and wherein M has the same meaning as in formula I above, can advantageously be present in the copolymers. The salts of copolymers prepared according to the process of the present invention preferably contain at least 50 mol% of alpha-hydroxyacrylate monomeric units as defined in formula I above and, more particularly, at least 65 mol% of such units. Salts of copolymers which it is of particular value to prepare according to the process of the present invention are salts of copolymers of unsubstituted acrylic acid with alpha-hydroxyacrylic acids.

The process of the present invention can be applied very particularly to the manufacture of salts of poly-alpha-hydroxyacrylic acids for which $R_1$ and $R_2$ represent hydrogen or a methyl group, it being possible for $R_1$ and $R_2$ to be identical or different. The best results are obtained in the manufacture of salts of unsubstituted poly-alpha-hydroxyacrylic acids, and, more particularly, in the manufacture of salts of homopolymeric unsubstituted poly-alpha-hydroxyacrylic acids.

The solid polylactones used as starting products in the process of the present invention are inter- and intra-molecular esters of the corresponding poly-alpha-hydroxyacrylic acids. In these polylactones, approximately 30 to 100%, and generally 40 to 100%, of the acid groups of the alpha-hydroxyacrylic monomeric units are esterified by alcohol groups.

These polylactones are most frequently products resulting from the hydrolysis of the polymers derived from corresponding alpha-chloroacrylic acids. They can especially be prepared by homo- or co-polymerization and hydrolysis of alpha-chloroacrylic acids, it being possible for the latter optionally to be prepared in situ by dehydrochlorination of alpha-beta-dichloropropionic acids. Such processes for the preparation of polylactones are described especially in Belgian Pat. Nos. 817,678, and 817,679 of July 15, 1974 in the name of Solvay & Cie. which patents are hereby incorporated by reference. It is also possible to prepare these polylactones by halogenation and hydrolysis of polyacrylic acids. A process of this type is described in published German patent application No. 2,211,256 of Mar. 9, 1972, in the name of KNAPSACK A.G. which is hereby incorporated by reference.

Among all these known processes, the process described in the above Belgian Pat. No. 817,679 has proved particularly advantageous for the preparation of the polylactones used in the process of the invention. The solid polylactones obtained in accordance with the process described in Belgian Pat. No. 817,679 can be isolated from their formation medium, by any method which is in itself known and especially by filtration or centrifuging, before they are used. They can be used either in the wet state or after drying. If the polylactones are used in the wet state, the amount of water which has to be introduced into the reactor for the formation of the desired salts is, of course, reduced by the amount of water retained by the wet polyactone.

The base employed to react with the polylactones in the process of the present invention can be any organic or inorganic base. Generally, the amount of base used is the stoichiometrical amount.

Advantageously, an alkali metal hydroxide or ammonium hydroxide or a nitrogen-containing organic base can be used. The nitrogen-containing organic base can be of the aliphatic type possessing a nitrogen atom substituted by one or more alkyl groups which contain 1 to 6 carbon atoms and which can be substituted. Mono- and di-ethanolamine may be mentioned as examples of a nitrogen-containing organic base which can be used in the present invention. The nitrogen-containing organic base can also be of the alicyclic or aromatic type and may or may not contain the nitrogen atom in the ring. Alkali metal hydroxides and ammonium hydroxide are very particularly suitable, the hydroxide most frequently used being sodium hydroxide.

The process which forms the subject of the present invention is thus advantageously applied to the manufacture of sodium salts of poly-alpha-hydroxyacrylic acids, and especially poly-(sodium alpha-hydroxyacrylates).

The base can be introduced into the reaction medium either directly or after it has been dissolved in water or in the diluent. Most frequently, the base will be dissolved in water before being introduced into the reactor.

The diluent used in the practice of the present invention can be any diluent which, in the form of a mixture with suitable amounts of water, does not dissolve either the polylactone or the salt which it is desired to prepare. The nature of the diluent and the amounts of diluent used are chosen so that the solubilities of the polylactone and of the salt obtained are each less than 2% by weight relative to the weight of the water/diluent liquid medium under the working conditions. The diluent can advantageously be chosen from among alcohols. As alcohols, aliphatic alcohols containing 1 to 5 carbon atoms can especially be used. Among these alcohols, methanol has proved to be particularly advantageous.

In order to carry out the process according to the present invention, the starting polylactone will generally be suspended in the water/diluent medium before it is reacted with the oxidizing agent and the hydroxide. Other processes can also be suitable. It is thus possible, for example, to introduce the polylactone into the water/diluent/base medium or into the water/diluent/oxidizing agent medium.

The amount of diluent used is such that, after introducing the total amount of water employed, the amount of water in the liquid medium is between 10 and 60% by weight of the total amount of the liquid medium.

The reaction is advantageously carried out at temperatures between ambient temperature and the boiling point of the reaction medium at the reaction pressure, and especially, between 15 and 150° C. The reaction pressure is not critical. Pressures equal to, less than or greater than atmospheric pressure can be used. Pressures between 0.5 and 5 kg/cm$^2$ are preferred for reasons of convenience.

When the starting polylactone is brought into contact with the oxidizing agent in the water/diluent medium before the introduction of the neutralizing base, the neutralizing base may be introduced into the medium at any time thereafter; usually the base is introduced less than 1 hour after the mixing of the oxidizing agent with the polylactone.

This procedure is usually used when one wishes to obtain a white polymer which simultaneously has a reduced molecular weight.

The use of water/diluent liquid medium which does not dissolve either the polylactone or the salt, as the reaction medium, is particularly advantageous since the salt obtained, which remains suspended in the water/diluent liquid medium, can be isolated easily from the medium by means of any method which is in itself known such as, for example, filtration or centrifuging, without requiring prior precipitation which is particularly difficult to carry out.

As in U.S. Pat. No. 3,994,969, the amount of diluent to be employed is surprisingly very low by comparison with the amount of non-solvent necessary to effect the precipitation of equivalent amounts of salts from their aqueous solutions in the known processes. The steps involving purification and recycling of the diluent are thus greatly simplified.

Finally, the process can be used no matter what the quantity of polylactone suspended in the liquid mixture may be. It is thus possible to obtain mixtures which can contain up to 50% by weight of salt relative to the total weight. Lower proportions of salt can, of course, be considered, but are less valuable economically, while at higher proportions, the suspensions become difficult to handle. The amount of dry polylactone suspended in the liquid mixture is usually between 0.1 and 50% by weight and more generally between 1 and 35% by weight of the total weight of the reaction medium.

The examples which follow are in no way limiting and are given in order to show the remarkable results obtained according to the present improvement.

Example

A suspension of 30 g of polylactone derived from poly-alpha-hydroxyacrylic acid in 210 g of methanol and 54.3 g of water is placed in a 0.5 liter round-bottomed flask, at ambient temperature, and a 30% strength solution of hydrogen peroxide in water is added to this suspension. The molar ratio of the total amount of hydrogen peroxide introduced to the hydroxyacrylic units of the polylactone is given in the table below. The suspension obtained is then heated to 40° C. in the course of 10 minutes. 38.4 ml of a 10 N solution of sodium hydroxide are then added in the course of 10 minutes, and the suspension is kept at 40° C. for a further 50 minutes.

The product which is finally obtained is then filtered off, washed with methanol and dried at 50° C. under a reduced pressure of 20 mm of mercury for 8 hours.

The table shows the change in the whiteness and in the molecular weight of the sodium salt of the poly-alpha-hydroxyacrylic acid as a function of the molar ratio of hydrogen peroxide to the hydroxyacrylic units of the polylactone employed.

Experiment 1R, in which no hydrogen peroxide is employed, is given by way of comparison. Experiments 2 to 8 were carried out according to the process of the present invention.

The degrees of whiteness measured have been expressed in comparison to the whiteness of magnesium oxide, and the molecular weights are determined in accordance with the Flory relationship (L. MANDERKERN and P. J. FLORY, Journal of Chem. Physics, 1952, 20, pages 212–214).

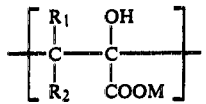

TABLE

| Experiment | Whiteness of the starting polylactone in % of MgO | Ratio of mol % of H$_2$O$_2$/hydroxyacrylic units | Percentage of oxidizing agent consumed | Whiteness of the sodium salt obtained in % of MgO | Molecular weight, by the Flory method, of the sodium salt obtained × 10$^{-3}$ |
|---|---|---|---|---|---|
| 1R | 81.7 | 0.00 | — | 73.0 | 66 |
| 2 | 81.7 | 0.25 | ≧93.5 | 76.0 | not measured |
| 3 | 81.7 | 0.50 | 94.0 | 77.2 | 61 |
| 4 | 81.7 | 1.00 | not measured | 80.2 | 50 |
| 5 | 81.7 | 1.50 | 82.3 | 81.6 | not measured |
| 6 | 81.7 | 2.00 | 84.0 | 82.4 | 46 |
| 7 | 81.7 | 3.00 | 82.0 | 82.9 | 37 |
| 8 | 81.7 | 4.00 | 71.4 | 84.5 | 42 |

Examination of the results shows that the addition of hydrogen peroxide to the polylactone before neutralization makes it possible to obtain a salt of poly-alpha-hydroxyacrylic acid having a whiteness which is essentially equal to, or even greater than, the whiteness of the starting polylactone (Experiments 5 to 8).

Furthermore, examination of the results also shows that it is possible to reduce the molecular weight of the starting product according to the amount of oxidizing agent employed and, starting from a polylactone of a given molecular weight, to obtain salts of poly-alpha-hydroxyacrylic acids of various molecular weights.

It will be understood that the above description of the present invention is susceptible to various modifications, changes and adaptations, and the same are intended to be comprehended within the meaning and range of equivalents of the appended claims.

What is claimed is:

1. Process for the manufacture of a salt of a poly-alpha-hydroxyacrylic acid, which salt contains monomeric units of the formula:

in which R$_1$ and R$_2$ independently represent hydrogen or an alkyl group containing from 1 to 3 carbon atoms, and in which M represents the cationic radical resulting from the dissociation of a base, by reacting, with the base, in the presence of water, a solid polylactone derived from the corresponding poly-alpha-hydroxyacrylic acid, in which process the reaction is carried out in liquid medium containing water and a diluent, the diluent being one which does not dissolve the polylactone and the salt produced and being present in an amount such that the polylactone and salt produced do not dissolve in the medium, comprising: adding an oxidizing agent to the liquid medium.

2. Process according to claim 1, wherein the oxidizing agent is introduced into the liquid medium before the neutralizing base.

3. Process according to claim 1, wherein the oxidizing agent is hydrogen peroxide.

4. Process according to claim 1, wherein the oxidizing agent is employed at a rate of 0.01 to 15 mol%, relative to the number of hydroxyacrylic units present in the starting polylactone.

* * * * *